S. A. Moody.

Hoop Skirt.

No 1872 Reissued Feb. 14, 1865

Witnesses.

O. Schaeffer.

C. D. Smith.

Munn & Co Attys

For Mrs. S. A. Moody.

UNITED STATES PATENT OFFICE.

SARAH A. MOODY, OF NEW YORK, N. Y.

IMPROVEMENT IN HOOP-SKIRTS.

Specification forming part of Letters Patent No. 42,677, dated May 10, 1864; Reissue No. 1,872, dated February 14, 1865.

*To all whom it may concern:*

Be it known that I, S. A. MOODY, of the city, county, and State of New York, have invented a new and useful Improvement in Hoop-Skirts; and I do hereby declare that the following is a full, clear, and exact description thereof, reference being had to the accompanying drawings, in which—

Figure 1:
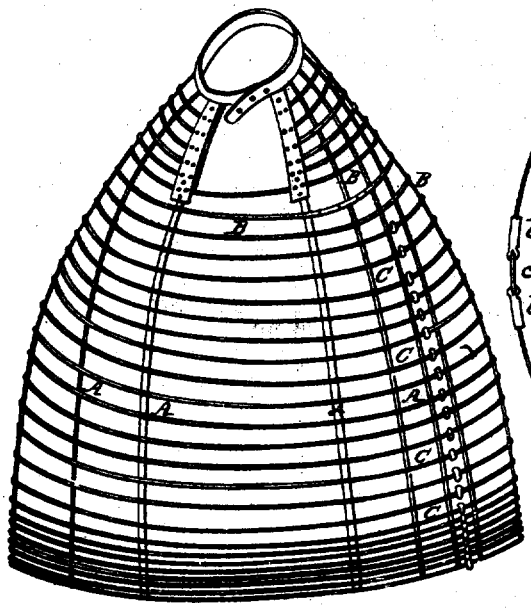
Figure 2:
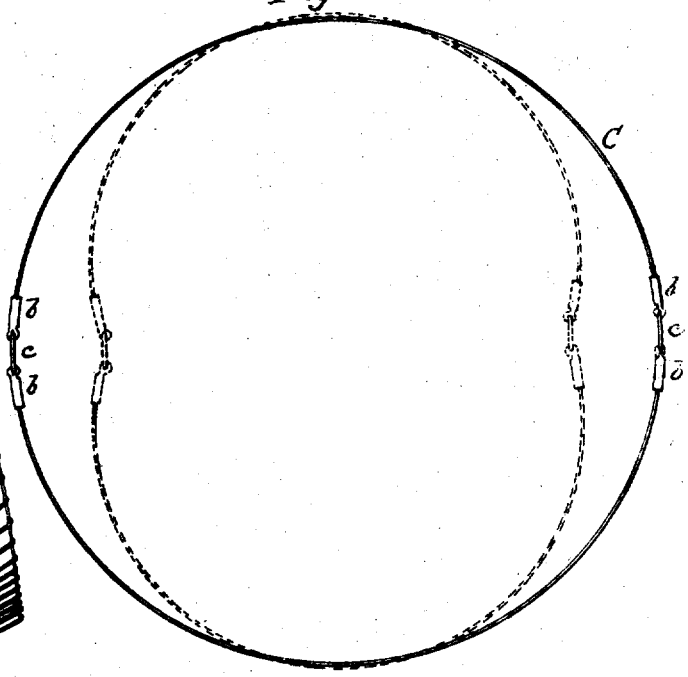
Figure 3:
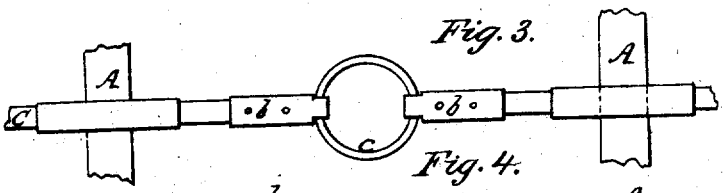
Figure 4:
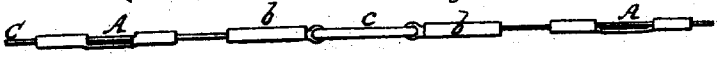

Figure 1 represents the skirt in use. Fig. 2 is a view of a hoop detached; Fig. 3, an enlarged view of a joint in said hoop; Fig. 4, an edge view of Fig. 3.

The purpose of my invention is to permit a hoop-skirt to collapse when subjected to lateral pressure externally, without being unduly projected outward or raised on the opposite side, the effect also of my improvement being, when the front or back part of the skirt thus made is pressed inward, as in sitting down, &c., to draw down the opposite side instead of elevating it as in the ordinary hoop-skirt. For this purpose I construct the lower hoop of a skirt up to about the height of the hips (more or less) in two parts and connect them by flexible joints, which have a free motion in all directions, as clearly seen in Figs. 2, 3, 4. These joints are placed on the sides of the skirt, as seen in Fig. 1.

The construction of my improved skirts is as follows: A series of hoops are connected as in ordinary hoop-skirts by any of the well-known ways—such as tapes, cords, or other devices—as these form no part of my invention, and the joints by which the ends of the two sections of each hoop are united may be varied in specific construction, so that they have the essential feature of general flexibility, and are so made as not to entangle when the skirt is taken up or collapsed. One mode of so constructing a skirt I have herein clearly described and illustrated in the drawings.

A represents the tapes that extend from the belt to the bottom hoop of the skirt and connect the hoops B and C together in proper position, as in skirts now in use. From the belt downward to the hips (more or less) I insert hoops B, of the usual form and made in one piece, some of the lower ones of which should extend around the entire circle at the hips, so as to properly support the outer dress and aid in shaping the other portions properly when the wearer is standing. The lower hoops, C, extending from a point at or near the hips downward, are made, as before named, of two parts joined at their ends by flexible joints, which, in the drawings, consist of a ring, *c*, united to the ends of the sections of the hoop by metal links or clasps, *b*, which clasps or links play loosely on the ring, and they form the flexible joint. These lower hoops, C, are placed in the skirt with the joints at the side and in a right line one above the other, and on each side of the line of joints, and near to them, the hoops should be supported by the connecting-tapes or other suspenders, A. These may be united above the line of joints and continue up to the belt in one, as seen in Fig. 1 in the drawings, or the two may be continued up to the belt separately.

I am aware that hoop-skirts have before been formed with joints or hinges to fold inward or up and down while the skirt is kept in a rigid circle, some of which have had joints all around to fold into a small compass, but they are complex and require manipulating to fold and unfold; they are easily deranged and misplaced so as to require special adjustment by the hand of the wearer. All such devices differ from mine, and I hereby disclaim them.

The advantages of my invention result from jointing only a suitable number of hoops, the upper ones being left without joints entire so as to support the principal weight of the clothing in proper position; and by only having two joints in each of the jointed hoops, one on each side, it will be apparent that all desirable contraction or collapse is amply provided for, the hoops will readily yield to a pressure on either side without being deranged on the opposite side, and, if borne inward in front or rear, the opposite side, instead of being thrown outward or upward, will be drawn down nearer the person by the spreading out of the sides, so as to cause the drapery of the skirts of the dress to fall as gracefully as if no hoops were worn. The stiff joints—such as have been heretofore employed, or those provided with springs and the like—besides their expense and liability to derangement, require special adjustment by hand to contract them and restore them to their normal position, while in my hoop-skirt the joints are perfectly free, yielding to the slightest pressure, so that no attention from the wearer is required, and no inconvenient or awkward position can be assumed by the clothes in passing through a narrow space, sitting in an arm chair, or entering a carriage, nor can the hoops be placed in any position from which they will not return to the proper form when released, thus requiring no attention to cause the garments to return to their symmetrical shape.

Having thus fully described my improved jointed hoop-skirt, what I claim therein, and desire to secure by Letters Patent, is—

A hoop-skirt having any number of its lower hoops divided and jointed on each side with flexible joints, substantially as and for the purposes herein described.

S. A. MOODY.

Witnesses:
J. J. GREENOUGH,
ROBERT H. CORBETT.